United States Patent [19]

Petrak

[11] Patent Number: 5,044,479
[45] Date of Patent: Sep. 3, 1991

[54] REMOTE-ACTIVATED, POWER SHIFT CLUTCH ASSEMBLY

[75] Inventor: Harry A. Petrak, Boulder, Colo.

[73] Assignee: Boulder 12 Investments, Boulder, Colo.

[21] Appl. No.: 491,736

[22] Filed: Mar. 12, 1990

[51] Int. Cl.⁵ .............................................. F16D 39/00
[52] U.S. Cl. .................................... 192/49; 192/50; 192/85 CA; 192/88 A
[58] Field of Search ........... 192/49, 50, 85 CA, 88 A; 403/1; 180/247

[56] References Cited

U.S. PATENT DOCUMENTS

| 1,795,018 | 3/1931 | Foster et al. | 192/85 CA |
|---|---|---|---|
| 2,913,929 | 11/1959 | Anderson | 74/710.5 |
| 2,948,557 | 8/1960 | Howe et al. | 287/53 |
| 3,050,321 | 8/1962 | Howe et al. | 287/53 |
| 3,123,169 | 3/1964 | Young et al. | 180/41 |
| 3,217,847 | 11/1965 | Petrak | 192/31 |
| 3,753,479 | 8/1973 | Williams | 192/89 A |
| 4,192,411 | 3/1980 | Fogelberg | 192/49 |
| 4,271,722 | 6/1981 | Campbell | 74/710.5 |
| 4,281,749 | 8/1981 | Fogelberg | 192/36 |
| 4,282,949 | 8/1981 | Kopich et al. | 180/252 |
| 4,293,061 | 10/1981 | Brown | 192/67 R |
| 4,327,821 | 5/1982 | Telford | 192/49 |
| 4,365,696 | 12/1982 | Telford | 192/67 R |
| 4,381,828 | 5/1983 | Lunn et al. | 180/247 |
| 4,407,387 | 10/1983 | Lindbert | 180/247 |
| 4,452,331 | 6/1984 | Lunn et al. | 180/247 |
| 4,557,358 | 12/1985 | Petrak | 192/35 |
| 4,627,512 | 12/1986 | Clohessy | 180/247 |
| 4,694,943 | 9/1987 | Petrak | 192/35 |
| 4,775,040 | 10/1988 | Telford | 192/67 P |
| 4,787,491 | 11/1988 | Kato | 192/50 |

Primary Examiner—Allan D. Herrmann
Assistant Examiner—Nicholas Whitelaw
Attorney, Agent, or Firm—John E. Reilly

[57] ABSTRACT

A clutch assembly for automotive vehicle four-wheel drives either in association with an axle disconnect or wheel hub incorporates a power shift mechanism which can be remotely activated either when the vehicle is static, in motion and during either forward or reverse direction of movement to positively drive the clutch members into and out of engagement with one another. The power shift mechanism includes sealed envelopes in the form of expandable and contractable compartments which in response to a remote control valve will positively shift the clutch members into and out of engagement, and the members will remain in the shifted position without the continued application of force until positively shifted away from that position by the power shift mechanism.

18 Claims, 7 Drawing Sheets

REMOTE-ACTIVATED, POWER SHIFT CLUTCH ASSEMBLY

This invention relates to clutch mechanisms; and more particularly relates to a novel and improved clutch assembly for automatically engaging and disengaging the ground-engaging wheels of a motor vehicle.

BACKGROUND AND FIELD OF THE INVENTION

There is set forth and described in my prior U.S. Pat. No. 4,694,943, a novel and improved means for converting a drive system of a vehicle between two-wheel and four-wheel drive and in such a way as to establish dynamic engagement or disengagement of a clutch assembly by remote activation. That system was designed to overcome problems associated with the prior art systems which are capable of maintaining four-wheel drive only when the engine is running.

It is recognized that a clutch engaging or disengaging under applied torque must provide high linear or axial forces to assure sufficient penetration of the teeth on a clutch or high interface forces on friction drive clutches. In the case of gear-type clutches, insufficient or only gear tip penetration under torque will tend to destroy the gears. Moreover, when a vehicle is loaded or has variable tire sizes or pressures, or is used off-highway, the engaged components of the power train are subjected to wind-up torque lock. Thus, the force necessary to separate the clutch gears is often greater than the original force required for engagement.

In addition, it has been proposed to employ vacuum systems as a means of engagement and disengagement of the clutch gears. However, such systems have not been entirely satisfactory from the standpoint of meeting the force and loading requirements in effecting engagement and disengagement. Among other problems, the applied vacuum within the wheel envelope must be maintained continuously during four-wheel drive operation and can impose external atmospheric pressures on the wheel seals beyond the capability of the seals.

It has also been proposed to employ an electrical heating unit to expand a chambered gas for driving a piston which then drives a fork against a clutch gear. However, among other things, systems of this type do not always function quickly and can be affected by wide swings in temperatures.

In U.S. Pat. Nos. 4,293,061 to Brown and 4,627,512 to Clohessy, power shift mechanisms are provided and which are mounted coaxially with respect to the clutch members but are powered in one direction only and must overcome a spring force acting in the opposite direction. In the '061 patent to Brown, it is necessary to compress the air in an envelope in order to shift in the one direction and the reverse spring pressure must then create a vacuum in order to return the envelope to its original state; and in both it is necessary to apply a continuous pressure or vacuum to maintain the clutch members in the engaged mode. U.S. Pat. Nos. 2,913,929 to Anderson and 4,271,722 to Campbell generally rely upon a power shift mechanism to effect engagement and disengagement of a clutch member but are not mounted coaxially with respect to the clutch member. Other representative patents in this field are U.S. Pat. Nos. 3,123,169 to Young et al. and 3,050,321 to Howe et al.

SUMMARY OF THE INVENTION

It is therefore an object of the present invention to provide for a novel and improved clutch assembly which can be positively engaged and disengaged by remote activation in a highly efficient and reliable manner; and specifically wherein a clutch assembly is adaptable for use in effecting dynamic engagement and disengagement of one or both of the front or rear ground-engaging wheels of a four-wheel drive vehicle.

It is another object of the present invention to provide for positive, dynamic engagement and disengagement of an axle disconnect or wheel clutch mechanism either while the vehicle is static, in motion, or in response to remote operated control and during either forward or reverse direction of movement of the vehicle, and wherein engagement and disengagement can be effected independently of the application of torque between the driving and driven elements.

A further object of the present invention is to provide for a novel and improved method and means for effecting positive engagement and disengagement of a clutch mechanism employed in a four-wheel drive vehicle which is under the complete control of the operator at all times, will not accidentally shift as a result of engine shut-off or stall, sudden temperature or atmospheric changes or other exterior influences; and further wherein the clutch mechanism places the main driving force member on the same axis as the drive and driven clutching members or gears so as to establish circumferentially uniform axial clutching forces to avoid cocking, transverse wedging and high torque application to the gear sections.

A still further object of the present invention is to establish dynamic engagement or disengagement of a clutch assembly by remote activation and through the utilization of coaxially located, expandable and contractable power shift pressurizable compartments whereby under the pressurized expansion of one compartment the alternate compartment will contract proportionately to the expanding compartment enabling the total cubic displacement of the combined compartments to remain a constant in selectively driving clutch members to and from engagement.

It is an additional object of the present invention to provide for positive but remote activation of a clutch mechanism for selectively converting a motor vehicle between two-wheel and four-wheel drive modes in such a way as to avoid damage to the wheel seals or axle envelopes, is readily conformable to existing vehicle designs and can employ existing pressure sources on the vehicle as a means or remote activation of the clutch mechanism.

In accordance with the present invention, a remote-activated clutch assembly for effecting positive engagement and disengagement between a first rotatable drive member and second member to be driven in which an axially displaceable clutch member is keyed for rotation to the first drive member and a second clutch member is drivingly connected to the second member to be driven; the first clutch member is movable into and out of intermeshing engagement with the second clutch member, pressure-responsive shift means being associated with the first clutch member and which includes a pressure chamber(s) expandable and contractable in axial directions toward and away from the second clutch member, and fluid pressure-operated means for applying positive pressure to the shifting means and positively advancing the first clutch member into and out of engagement with the second clutch member.

A preferred form of the present invention resides in a remote activated, positive fluid pressure-operated system for converting a vehicle between two-wheel drive and four-wheel drive wherein drive means are provided for selectively and positively rotating a drive shaft for a ground-engaging wheel to be driven, the clutch assembly comprising a receiver gear drivingly connected to the ground-engaging wheel to be driven, a drive gear mounted for rotation with the drive shaft and axially movable with respect to the drive shaft into and out of engagement with the receiver gear, fluid pressure-responsive shift means engageable with the drive gear, and fluid pressure operated activating means for applying positive pressure to the shift means for positively advancing the drive gear into and out of engagement with the receiver gear in converting between two-wheel and four-wheel drive. The preferred form of invention is capable of utilizing the energy and force available from existing pressure pumps on the vehicle, such as, power steering pumps or vacuum brake assist motors as well as existing shift actuators on the vehicle to control the power shift means. Either one or two assemblies per vehicle may be utilized depending on whether it is incorporated as a part of the axle disconnect at an axle location or a hub lock at a wheel hub location or at other locations along the vehicle power train; and, regardless of location, is compatible with other components within the power train so that shifting may be sequenced preceding, simultaneously with, or subsequent to torque application to the train or utilize a different sequence for engagement than for disengagement to relieve functions of other power train components.

In the preferred form, the shift means comprises coaxially located, expandable and contractable compartments separated by a fixed wall, and the compartments cooperatively expand and contract so that with the pressurized expansion of one compartment the coaxially located alternate compartment contracts in proportion to the expansion of the one compartment thereby enabling the total cubic displacement of the combined compartments to remain constant during the shift operation; and in shifting an integrated linear shift drive means is coaxially located with respect to the clutch members and driven axially in reverse or opposite directions depending upon which chamber is expanded. The shift means further works in cooperation with a releasable detent which will releasably retain the clutch members in the position to which driven by the shift means independently of the expansion and contraction of the compartments.

The above and other objects, advantages and features of the present invention will become more readily understood and appreciated from a consideration of the following detailed description of a preferred embodiment of the present invention when taken together with the accompanying drawings in which:

DETAILED DESCRIPTION OF THE PREFERRED EMBODIMENT

Figure 1:
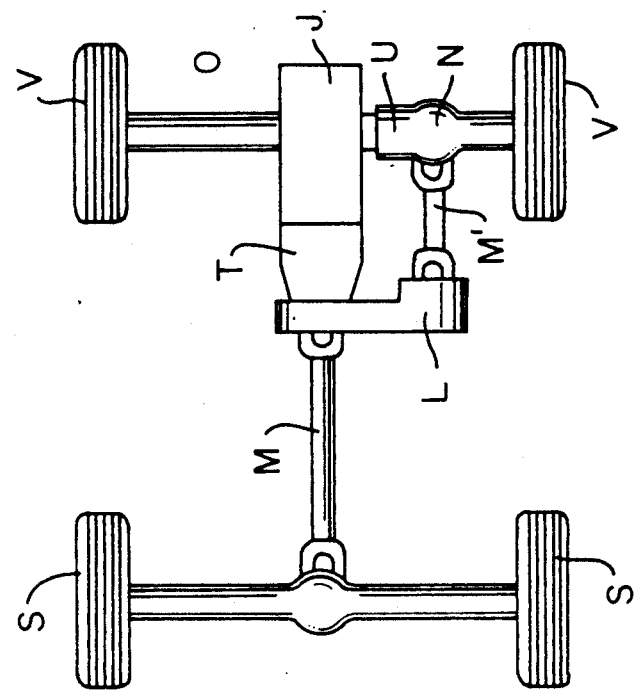
FIG. 1 is a schematic illustration of the power train of a vehicle employing a clutch mechanism at each front wheel for the purpose of engaging and disengaging the power train with respect to the front wheels.
Figure 2:
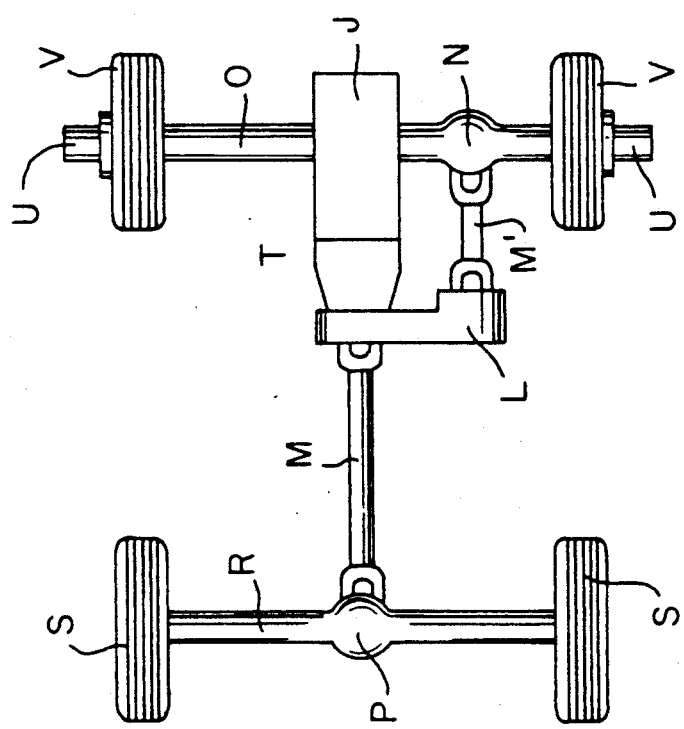
FIG. 2 is a schematic illustration of the power train of a four-wheel drive vehicle having a single axle disconnect for engaging and disengaging the power train at the axle disconnect location of a front axle.

Referring in more detail to the drawings, in FIG. 1 a preferred form of clutch assembly U is connected to each of the front ground-engaging wheels V of a motor vehicle; and in FIG. 2 the clutch assembly U is illustrated as an automatic axle disconnect associated with a front drive shaft of a vehicle, although it will become more readily apparent that the clutch assembly of the present invention has a number of other useful applications.

In FIG. 1, an engine J has a transmission T into a rear propeller shaft M and a transfer case L, the latter extending into front propeller shaft M' into front differential N and front axle housing O. The propeller shaft M is coupled with a rear differential P in the rear axle R for the rear wheels S. Engine power is transmitted through the transmission T via transfer case L and front propeller shaft M' to the front differential N and a drive shaft A within the axle housing O. When four-wheel drive is desired, the transfer case L is shifted to engage the front drive system to supply power through the front propeller shaft M' and differential N to the clutch assemblies U mounted at either end of the axle or shaft A; and when the clutch assemblies are engaged in a manner to be described will impart positive rotation to the front wheels V.

In FIG. 2, when the operator desires four-wheel drive, the transfer case L is shifted to engage the front drive system and apply power to the front propeller shaft M' and differential N to the front axle or shaft portions within the housing O so as to drive the front drive shaft A in a manner described in more detail with reference to FIG. 7.

Figure 3:
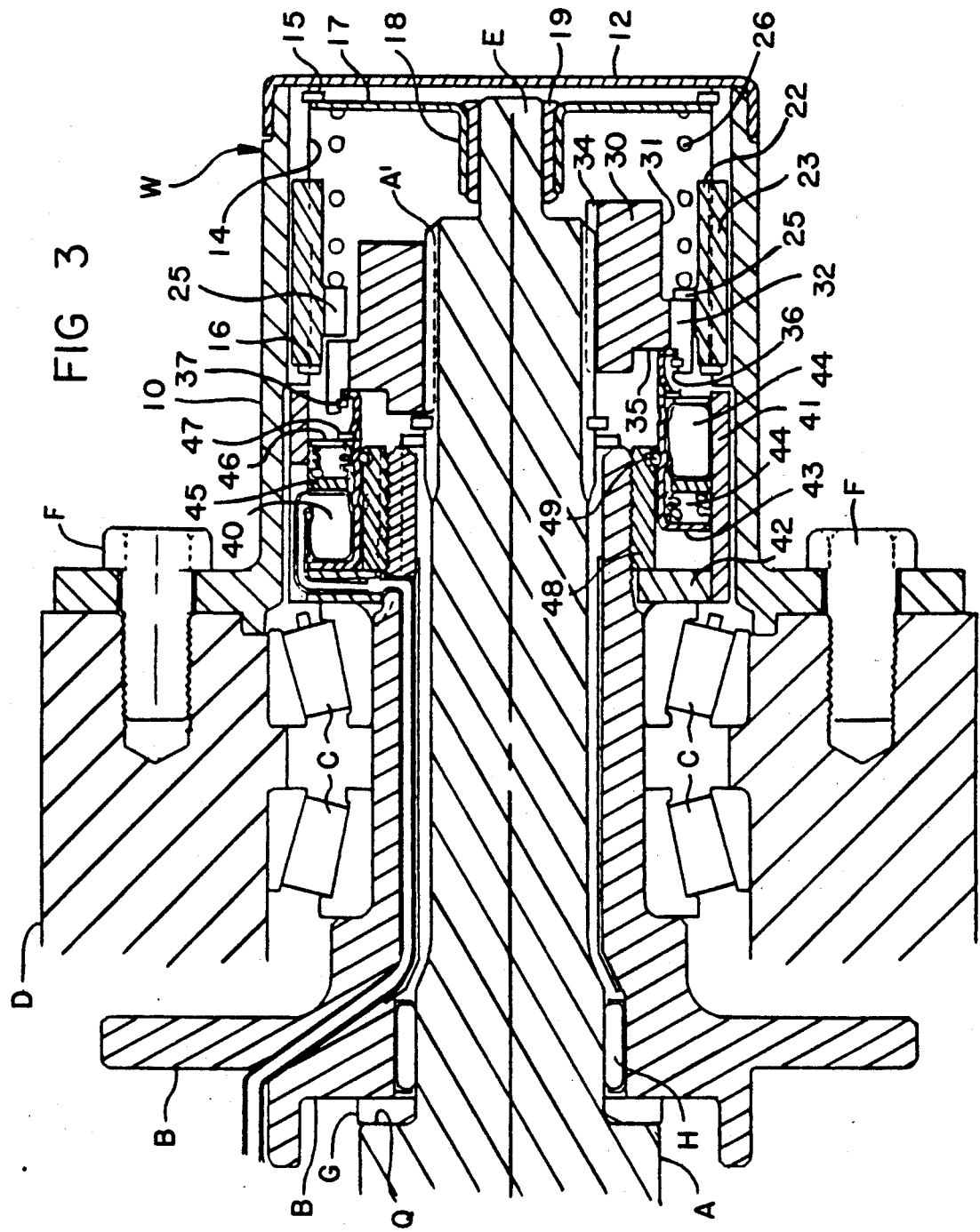
FIG. 3 is a sectional view of a preferred form of clutch mechanism in which the upper half of the section illustrates the mechanism in two-wheel drive mode and the lower section in four-wheel drive mode.

Referring to FIG. 3, the drive shaft A is housed within a non-rotating spindle B at each end of the axle housing O, and opposite ends of the shaft A include circumferentially spaced, axially extending splines A' as well as smaller diameter, smooth surfaced extensions E which are inserted into and radially supported by the bearings 19.

Figure 6:
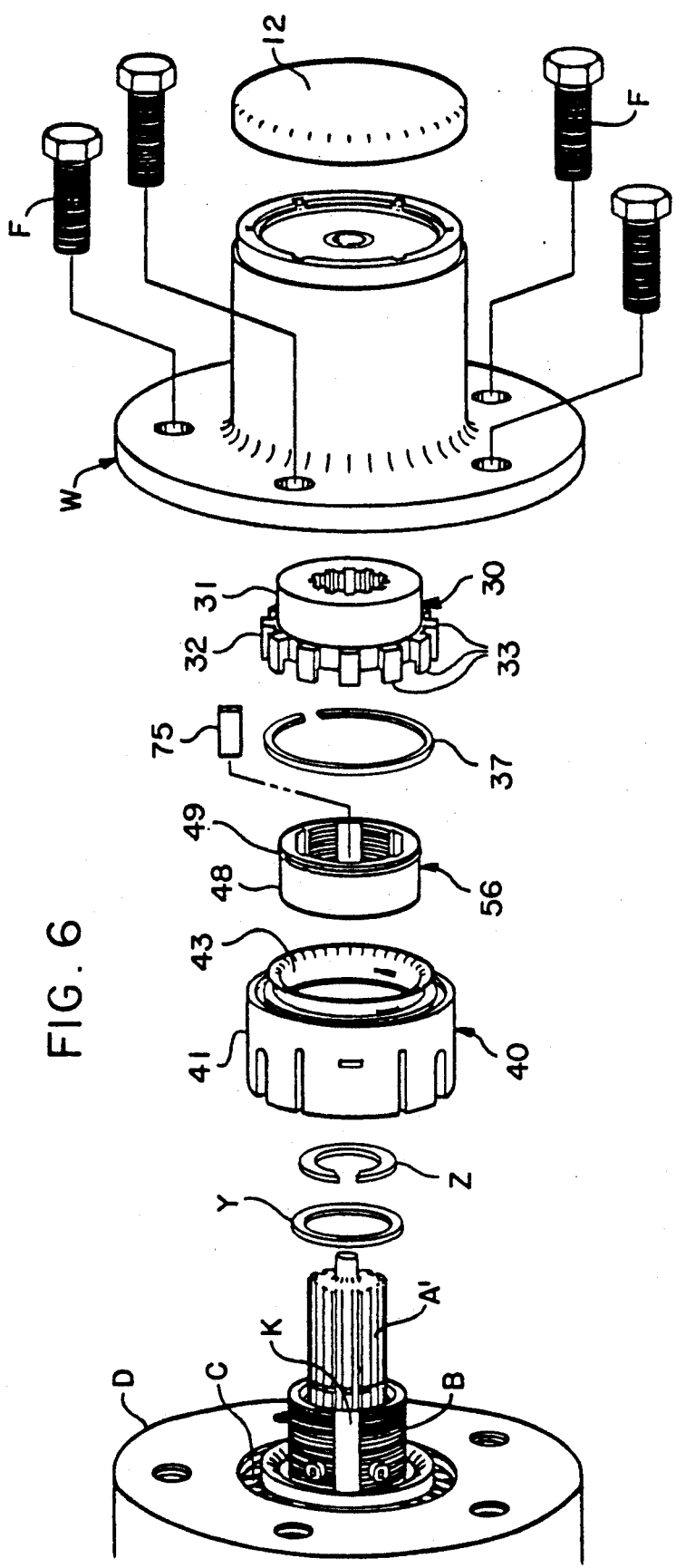
FIG. 6 is an exploded view of the preferred form of clutch mechanism with the parts and subassemblies aligned to show the sequence of application to the vehicle.

Referring to FIGS. 3 and 6, the spindle B is a fixed tubular member which is externally threaded for a limited distance along each external surface at opposite ends, each threaded portion being interrupted by a keyway K extending parallel to the axis of the spindle B. Radial bearings C are disposed in surrounding relation to the spindle B for the purpose of radially supporting a wheel hub D. A receiver housing W is mounted on the wheel hub by means of fasteners in the form of cap screws F. A thrust washer G is interposed between an external shoulder Q of the shaft A and an end surface B' of the spindle B and, in conjunction with washer Y and retaining ring Z, maintains the relative axial location of the shaft A within the spindle B. A needle bearing H is interposed between the spindle B and shaft A adjacent to the washer G.

Figure 5:
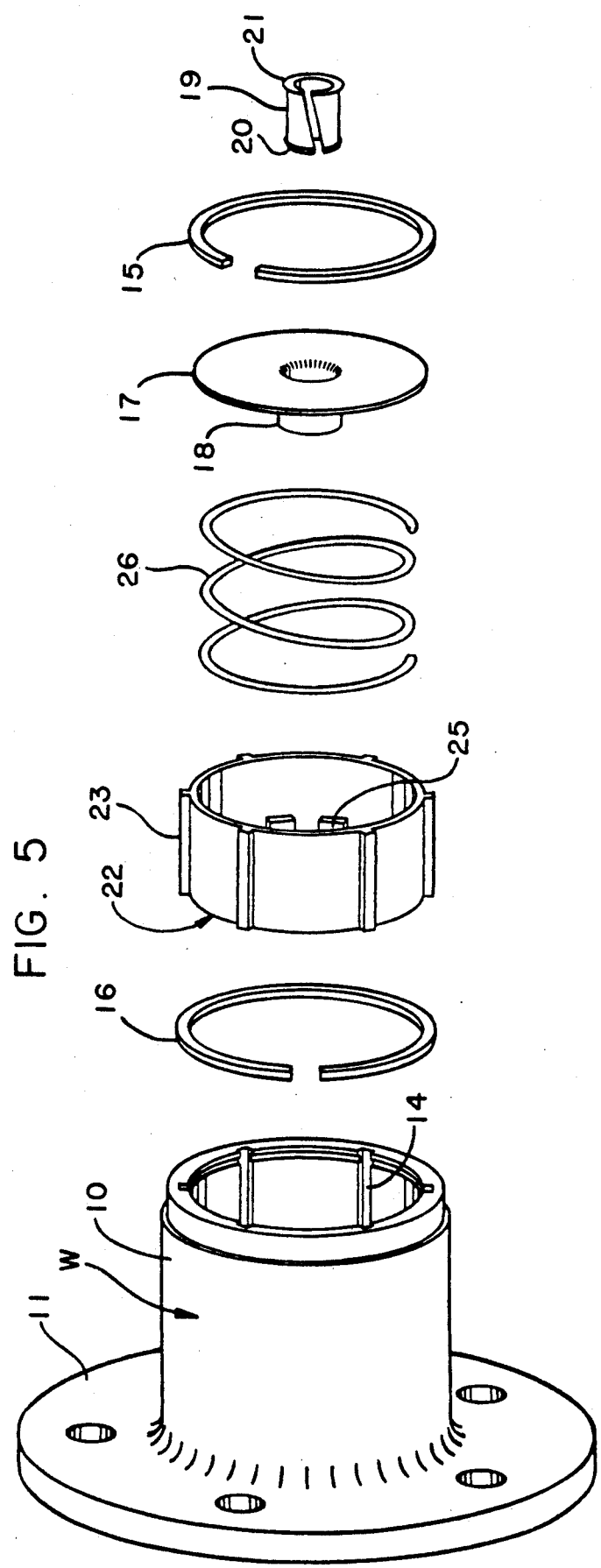
FIG. 5 is an exploded view of the receiver gear of the clutch mechanism.

As illustrated in FIGS. 3 and 5, the receiver housing W is comprised of a thick-walled, hollow cylindrical portion 10 having a flange 11 extending radially outwardly from the inboard end of the portion 10 with circumferentially spaced openings for threaded connection of the cap screws F and into threaded bores in the wheel hub D in order to mount the receiver housing W in fixed relation to the wheel hub. The outboard end of the cylindrical portion 10 is closed by an end cap 12 which is of shallow, cup-shaped configuration and pressfit onto the end of the cylindrical portion 10. The inner wall of the cylindrical portion 10 is provided with circumferentially spaced, axially extending splines 14 extending from the outboard end of the cylindrical portion 10 for approximately one-half the length of the cylindrical portion 10. A retainer ring 15 is inserted in pressfit relation to a groove at the outboard end of the portion 10 to act as a seat for a circular retainer element 17 provided with a central sleeve-like hub 18 for insertion of the bearing 19 for the outport extremity of the shaft A. The retainer 17 is preferably in the form of a thin-walled disk which is sized to fit closely within the smaller diameter of the internal splines 14 of the cylindrical portion 10. The radial bearing 19 is in the form of a split sleeve having opposite flanged end portions 20 and 21, and the bearing is of sufficient resiliency that it may be compressed for insertion into the hub 18, as shown, and expanded outwardly into fixed engagement with the hub.

The receiver gear 22 is disposed within the receiver housing W and is of heavy-walled tubular configuration provided with external, axially extending ribs or splines 23 at equally spaced circumferential intervals to interengage with the internal splines 14 in the receiver housing for axial slidable movement between the outboard retaining element 17 and an inboard retaining ring 16. The receiving gear 22 is provided with radially inwardly projecting tooth elements 25 and which are arranged at equally spaced circumferential intervals around the inner surface of the gear 22 but of a limited length with respect to the total length of the gear. The receiver gear 22 is normally biased or urged in an inboard direction so as to bear against the inboard retainer ring 16 under the urging of a coiled return spring 26 which is interposed between inner tooth elements 25 and the retainer element 17.

As further seen from FIGS. 3 and 6, a drive gear 30 is of thick-walled tubular configuration figuration having a smaller external diameter, smooth-surfaced portion 31 at one end and a larger diameter, toothed external surface portion 32 at its inboard end, the individual tooth elements 33 aligned for intermeshing engagement with the internal tooth elements 25 on the receiving gear 22. Axially directed splines 34 on the internal surface of the drive gear 30 are complementary with the external splines A' on the drive shaft A. In this way, the drive gear 30 is keyed for rotation with the drive shaft A but is axially slidable or displaceable independently of the drive shaft toward and away from the receiver gear 22. The inboard face of the drive gear is recessed as at 35 to define a shoulder portion 36 on the inner surface of the toothed section 32, and a retaining ring 37 is pressfit within a groove on the inner shoulder of the toothed section to establish locking engagement with the shift assembly 40 in a manner to be hereinafter described.

In order to positively control the movement of the drive gear 30 into and away from engagement with the receiver gear 22, in accordance with the present invention, the power shift assembly 40 is mounted on a common axis with that of the drive gear 30 and driven gear 22. From a consideration of FIGS. 3 and 4, the power shift assembly 40 is broadly comprised of a housing tube 41, keyed washer 42, drive tube 43, first and second expandable chambers 44 and 44', a divider washer 45, confinement washer 46 and a retaining ring 47.

Figure 4:
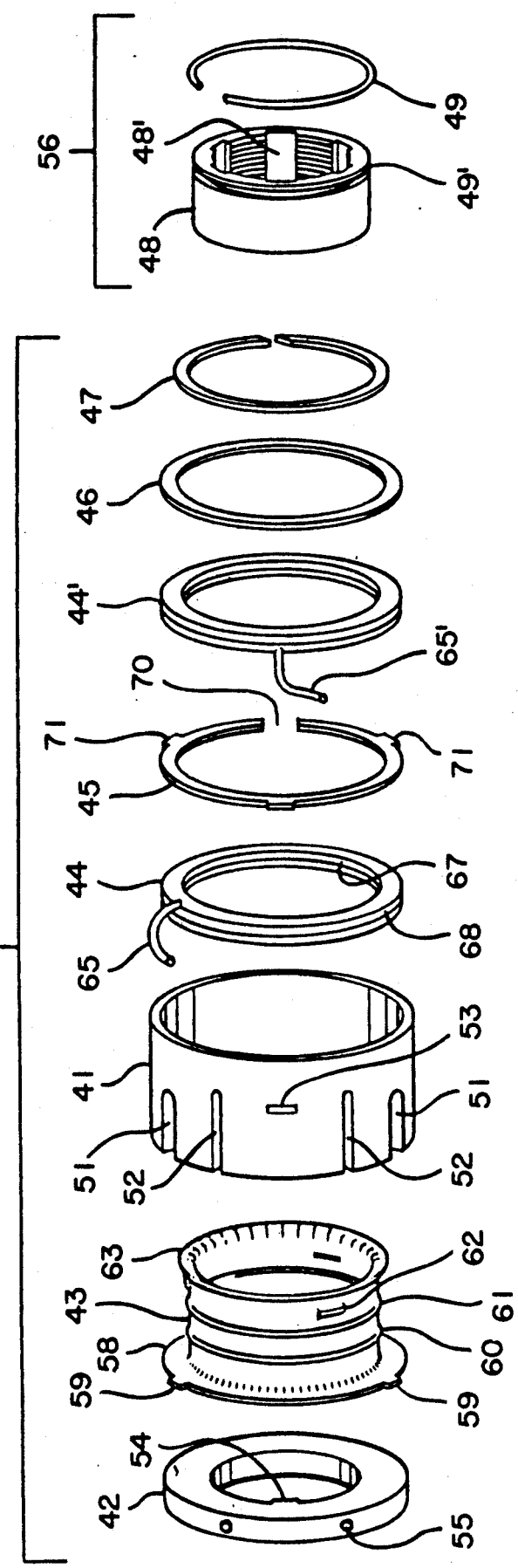
FIG. 4 is an exploded view of a preferred form of power shift assembly and the means for attaching the power shift assembly to the vehicle.

Referring to FIG. 4, the housing 41 is of tubular configuration and provided with narrow, elongated slots extending axially from the inboard end of the tube including three shorter slots 51 and a pair of longer slots 52. The slots 51 are of corresponding width and length and disposed at equally spaced circumferential intervals, while the slots 52 are spaced between two of the shorter slots 51. For example, the slots 52 as shown are spaced on the order of 60° apart and each being spaced inwardly on the order of 30° from one of the respective shorter slots 51. Rectangular apertures 53 are located at equally spaced circumferential intervals equidistant from the inboard end of the tube 41 with one of the apertures 53 located intermediately between the longer slots 52 as illustrated in FIG. 4.

The keyed washer 42 is a thick-walled annular member whose outer diameter establishes a snug fit with the inside diameter of the housing 41 and whose inner diameter establishes a snug fit with the threaded external surface of spindle B. A radially inwardly directed tab 54 on the inner surface of the washer 42 interlocks with the keyway K of the spindle B. In turn, radial bores 55 extend through the washer 42 on either side of the tab 54 and correspond to the circumferential spacing and location of the slots 52 on the housing tube 41.

The drive tube 43 is of thin-walled tubular configuration with an outwardly flared end portion 58 at one end which fits closely within the inner diameter of the housing tube 41, there being three equally spaced tabs 59 on the outer periphery of the end portion 58 which are sized and spaced to fit slidably into the shorter slots 51 of the housing tube 41. A pair of annular, roll-formed ribs 60 and 61 on the external surface of the drive tube 43 are axially spaced to correspond with opposite end limits of the shift length of the assembly. In this relation, the ribs form internal, circularly extending grooves in the wall of the drive tube 43 for releasable engagement with the retaining ring 49. Radially outwardly directed tabs 62 are located intermediately between rib 61 and outwardly flared end portion 63 of the drive tube, the retaining ring 47 being inserted in snap-fit relation between the tabs 62 and the confinement washer 46.

The inflatable chambers 44 and 44' are of generally doughnut-shaped or annular configuration and are separated by the common divider washer 45, there being thick-walled flexible tubes 65, 65' communicating with the sealed interior of a respective chamber 44, 44' and each tube extending away from its respective chamber through one of the longer slots 52 of the member 41 for insertion into radial bores 55 of the key member 42. Each of the chambers 44 and 44' is of a unitary molded construction having inner and outer spaced circumferential walls 67 and 68 which are directionally collapsible and expandable in an axial direction rather than a radial direction toward and away from the drive gear 30. The divider washer 45 is split or divided by a circumferential space or gap 70 and has external tabs 71 at spaced circumferential intervals for insertion into the apertures 53 on the tube member 41 so as to lock the washer 45 into position with respect to the member 41.

The confinement washer 46 has an outer diameter dimensioned for close-fitting insertion into the tube member 41, and the inner diameter of the washer 46 being great enough to clear the flared end portion 63 of the driver tube 43. The retaining ring 47 is circumferentially divided or split as shown so as to be radially expandable to a sufficient size to clear the end portion 63 as well as the tube 62 and to snap into position behind the tabs 62.

FIG. 4 depicts the sequence of assembling the shift mechanism 40 wherein the drive tube 43 is inserted into the left end of housing 41 with the tabs 59 inserted into slots 51. The thick-walled keyed washer 42 is next to be inserted and is permanently affixed to and within the housing 41, with the radial bores 55 aligned with slots 52 so that the flat face of the keyed washer 42 is flush with the end of the housing 41. Continuing the assembly the balance of the parts 44, 45, 44', 46 and 47 are inserted into the opposite end of the housing 41 to that of the washer 42. When the inflatable chambers 44 and 44' are inserted with the divider 45 therebetween, the tubes 65 and 65' are inserted within slots 52 and, with a coating of gasketing adhesive, are inserted into respective bores 55 of keyed washer 42.

Further referring to FIGS. 4 and 6, the nut assembly 56 consists of a nut 48 and a snap ring 49. The internal diameter of nut 48 is threaded onto the spindle B and has a series of circumferentially spaced keyways 48' at equal intervals which extend linearly within the inside diameter, interrupting the threads, which keyways are sized to match the keyway width of keyway K at spindle B. An annular groove 49' is cut into the outside diameter of nut 48, adjacent to the outboard end of the nut. Groove 49' is dimensioned to a width and depth to enable snap ring 49 to be fully compressed to a diameter less than the outside diameter of the nut. Snap ring 49 is formed of a round spring wire and sized to an outside diameter which exceeds the inside diameters of annular detent ribs 60 and 61 of the drive tube 43.

Referring to the overall disposition and assembly of the shift mechanism 40 relative to the spindle B, as shown in FIGS. 3, 4 and 6, after shaft restraint washer Y is placed against the outer face of spindle B and looked in position by retaining ring Z, the shift assembly 40 is next installed with the tab 54 of washer 42 interengaging the keyway K as the assembly 40 is slidably pushed onto spindle B. In this relation, the inner surface of washer 42 snugly engages the spindle B and the face of the washer 42 abuts the cone race member of bearing C.

With continued reference to FIG. 6, which shows the sequence of application of parts and subassemblies to the vehicle wheel end, the nut assembly 56 is screwed onto the spindle B within shift assembly 40 and against the inside face of washer 42. As commonly practiced in vehicle assembly, the nut 56 is tightened then slightly released to establish minimal wheel bearing end play.

One keyway 48' is aligned with keyway K of spindle B thereby allowing for the insertion of key 75 which locks the nut 48 against rotation on the spindle and further locks the shift assembly 40 into a non-rotating linear position.

As viewed from the upper section of FIG. 3, when the outboard chamber 44' is contracted and the inboard chamber 44 is expanded, it will cause inboard movement of the drive tube 43, and the flared end 63 of the tube 43 will engage the ring 37 to retract the drive gear 30 in a direction away from the receiver gear 22. Conversely, as viewed in the lower section half of FIG. 3, when the lefthand or inboard chamber 44 is contracted and the righthand or outboard chamber 44' is expanded it will axially displace the drive tube 43 away from the washer 42 causing the leading end 63 of the drive tube to bear against the end face of the drive gear 30 and to axially displace it in an outboard direction into intermeshing engagement with the tooth elements 25 of the receiver gear 22.

Figure 8:
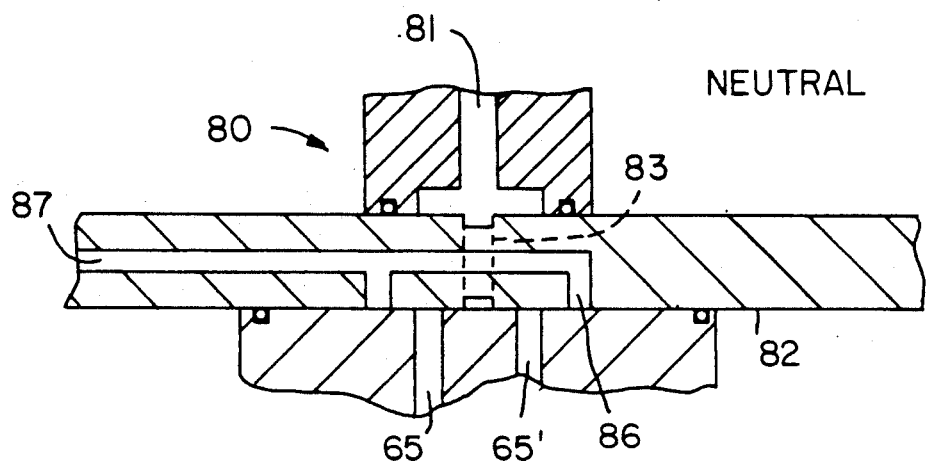
FIGS. 8, 9 and 10 are schematic illustrations of a preferred form of control valve for effecting engagement and disengagement of the clutch mechanism under the complete control of the operator at all times.
Figure 9:
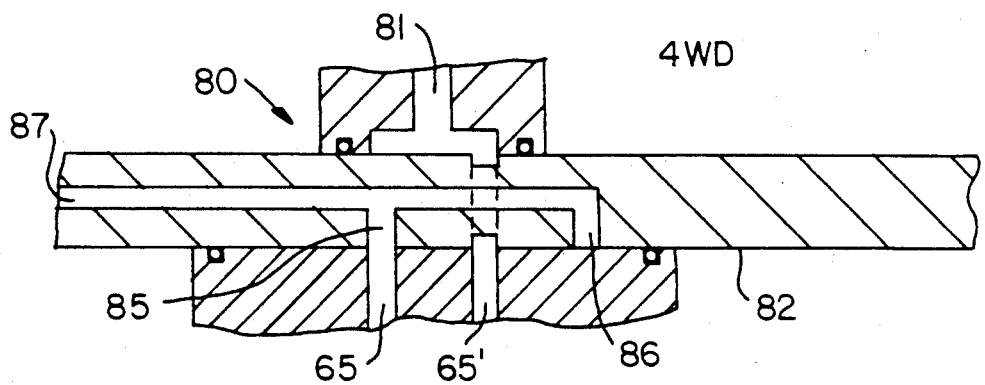
Figure 10:
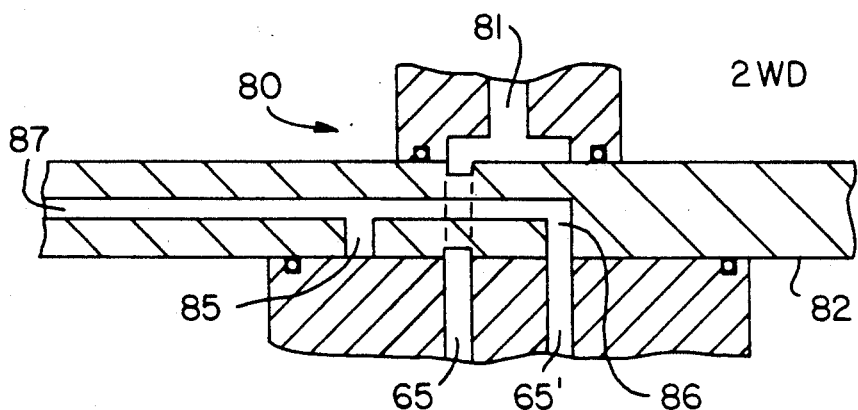

A preferred method and apparatus for activating the power shift assembly 40 is schematically illustrated in FIGS. 8, 9 and 10 wherein a flow control, dual selection valve 80 can be operated to control movement of the drive gear 30 into and out of engagement with the receiver gear 22. To this end, the valve 80 includes a source of fluid under pressure which communicates with a common port 81, and a sliding core element 82 includes an annular flow groove 83 which communicates with the port 81. Fluid return ports 85 and 86 communicate with a fluid reservoir via the common return line 87, and the control lines or tubes 65 and 65' into the chambers 44 and 44', respectively, are connected into the valve 80 as shown. In FIG. 8, the sliding core valve 80 is shown in the neutral position. The valve will move to an alternate position for the time required to shift the drive gear from one mode to another, such as, from an engaged to disengaged position with respect to the driven or receiver gear 22. After a shift has been completed the valve is then returned to its normal or neutral state as illustrated in FIG. 8.

Referring again to FIG. 3, the upper section illustrates the shift assembly with the drive gear in disengaged or the two-wheel drive mode. In order to shift to the four-wheel drive mode, the valve 80 is advanced to the position shown in FIG. 9 whereby fluid under pressure is directed through the port 81 and flow groove 83 to the flow tube 65' for the chamber 44'; and simultaneously the chamber 44 is opened through its flow tube 65 for return flow from that chamber through port 85 into the reservoir via line 87. Expansion of the chamber 44' will advance the drive tube 43 in an outboard direction thereby thrusting the drive gear 30 into engagement with the receiver gear 22. Should there be a substantial difference in revolutions per minute between the drive gear 30 and receiver gear 22, the receiver gear 22 is able to move in an outboard direction against the return spring 26 until the revolutions are nearly synchronized at which time the gear 30 will be aligned to advance into intermeshing engagement with the receiver gear 22. Recognizing that the shift assembly is not triggered by torque or engine power but functions independently of other power train components, this engagement can be caused prior to the application of torque to the drive or power train and with the high forces available from the pressure chamber to overcome the rebound force of the spring 26. Thus, the axial forces necessary to assure engagement between the gears 30 and 22 are considerably higher than the frictional resistance resulting from any drive line motoring torque. Prefunction engagement prior to applying engine or vehicle torque enables the transfer case gears to become synchronized before attempting engagement and accordingly enables relatively smooth, synchronous low force engagement of the transfer case.

Upon shifting to four-wheel drive, FIG. 9, the core valve 80 will return to its neutral position and no longer pressurize the chamber 44'. The valve 80 may incorporate any conventional form of bleed or bypass to permit a gradual reduction of the pressure and gradual relaxation of pressure within the chamber.

Shifting from the four-wheel drive mode to the two-wheel drive mode is illustrated in the upper section of FIG. 3 and in FIG. 10 when the valve 80 is shifted to a position in which the fluid under pressure is directed from the port 81 via the flow groove 83 to the tube 65 leading to the inboard chamber 44 and the chamber 44' is exhausted through its tube 65' to the reservoir. When this occurs, the drive tube 43 will retract the drive gear 30 away from engagement with the receiver gear 22 with the drive tube 43 axially displaced such that the ring 49 moves out of engagement with the inboard rib 60 and into engagement with the outboard rib 61.

For the purpose of illustration, as shown in FIGS. 3 and 6, the spindle B is provided with suitable passageways for extension of the pressure tubes 65 and 65' between the expansion chamber 44 and 44' and the flow control valve 80, the valve 80 being suitably positioned so as to be either directly or remotely controllable by the vehicle operator. The high pressure source of fluid may be derived from a power steering pump or other source of pressure in the vehicle; and a compressed gas, air or hydraulic fluid may be utilized. A most important consideration is that the power shift mechanism 40 is essentially confined within and integral to the wheel hublock envelope and can be remotely but positively controlled by the operator to advance and retract the drive gear 30 into and out of engagement with the receiver gear 22.

Description of Modified Form of the Present Invention

Figure 7:
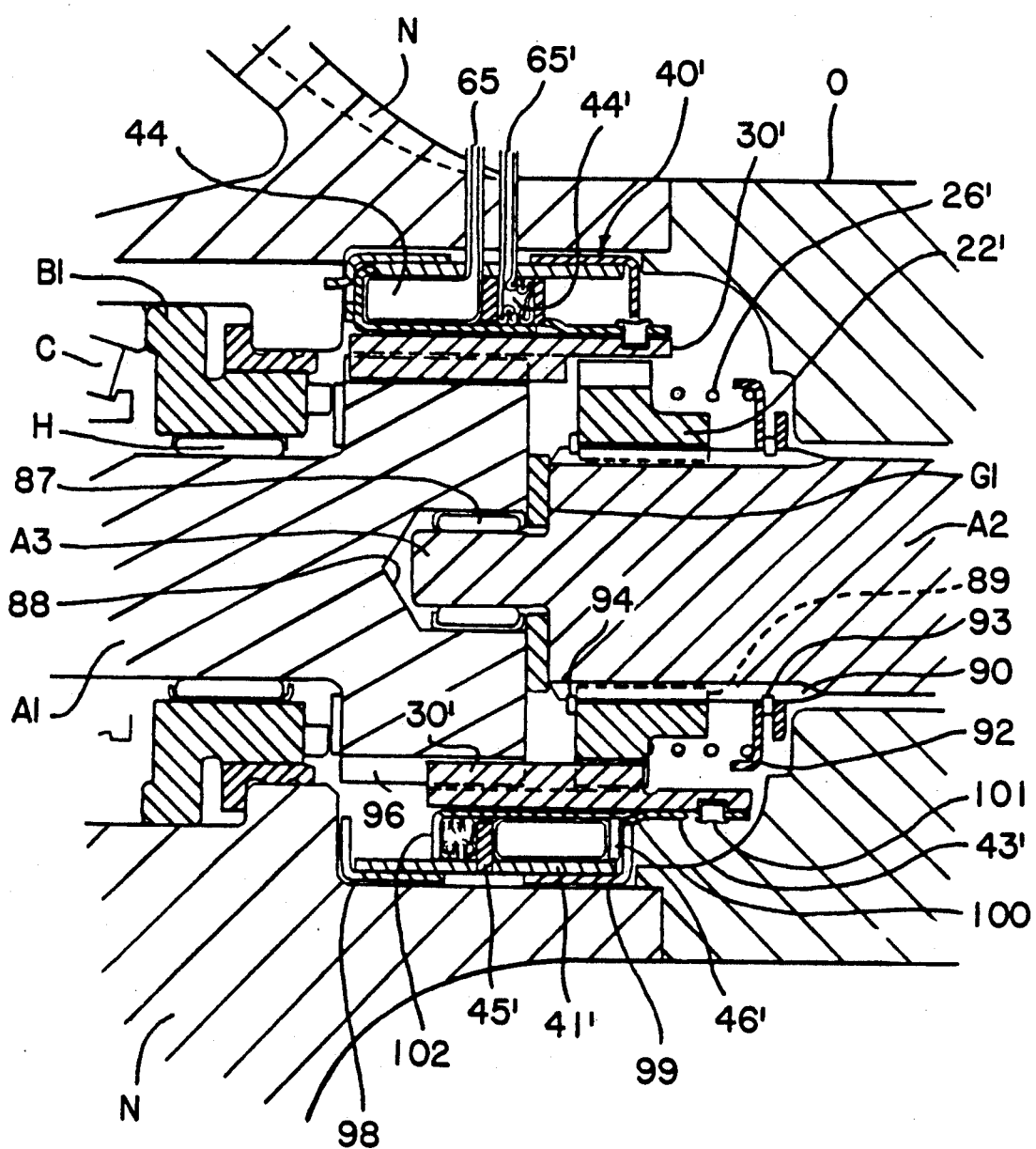
FIG. 7 is a sectional view of a modified form of clutch mechanism located within the axle and applied as an axle disconnect.

There is illustrated in FIG. 7 a modified form of clutch assembly U incorporated into an axle disconnect and specifically for the purpose of selectively engaging and disengaging one end of the drive shaft A with respect to the wheel hub D. As illustrated in FIGS. 2 and 7, the clutch assembly U' is incorporated as a unitary part of an axle disconnect in which axle portions A1 and A2 are selectively engaged and disengaged by the clutch assembly U' which is housed at the interface between differential N and the axis housing O. The drive shaft portions A1 and A2 are coaxially arranged in end-to-end relation to one another with a reduced end A3 journaled by a bearing 87 within a counterbored portion 88 at the end of the portion A1. In addition, the portion A1 is journaled with respect to non-rotating spindle B1, by bearing H. In this relation, like parts to those of the preferred form of FIGS. 1 to 6 and 8 to 10 are correspondingly enumerated, although it will be appreciated that their relative locations differ. Thus, a receiver gear 22' has internal splines 89 which interengage with external splines 90 on the shaft portion A2 and is axially displaceable between an annular cup-shaped ring 92, seated against retaining ring 93 at one end of the splines 90, and a retainer ring 94 at the opposite end of the splines 90. A return spring 26' is disposed for extension between the cup-shaped limit stop 92 and an end surface of the receiver gear 22' to bias the gear 22' in a direction toward the shaft portion A1.

The drive gear 30' is disposed in outer concentric relation to the receiver gear 22' and is provided with internal splined portions which engage external splines 96 on the shaft portion A1 and are slidably displaceable with respect to the splines 96 in an axial direction toward and away from the receiving gear 22' by the power shift mechanism 40'. An annular shim G1 is interposed between the confronting ends of the shaft portions A1 and A2. The modified form of power shift assembly 40' includes outer housing tube 41', inner drive tube 43', first and second chambers 44 and 44' separated by a divider washer 45' which extends radially between the outer housing tube 41' and inner drive tube 43'.

The outer housing tube 41' is mounted within axially spaced retainer cups 98 and 99, and a confinement washer 46' is disposed at one end of the chamber 44' and retained in position by a sprung extension tab 100 which projects radially and outwardly from the surface of the drive tube 43'. The drive tube is extended in outer concentric surrounding relation to the drive gear 30 ' and is affixed at one end, such as, by means of a rivet 101 to the gear 30', and the opposite end of the drive tube 43' is bent outwardly as at 102 to confine the end of the chamber 44. The chambers 44 and 44' function in the same manner as described with respect to the preferred form: Briefly, when the chamber 44' is contracted and the chamber 44 expanded it will cause movement of the drive gear 30' in a direction away from the receiver gear 22' into the relationship illustrated at the upper section of FIG. 7. As seen from the lower section of FIG. 7, when the chamber 44 is contracted and the chamber 44' is expanded, the drive tube 43 is displaced causing engagement of gear 30' with the receiver gear 22'. The manner and means for operating the power shift mechanism is the same as described with reference to the preferred form by remote activation through a selection valve as illustrated in FIGS. 8 to 10. Accordingly, when the mechanism has shifted the axle disconnect clutch assembly either to the engaged or disengaged position with respect to the receiver gear, the valve 80 will return to its neutral position in preparation for the next shifting operation. In both forms, the divider washer 45' is fixed in place to establish a stationary support for movement of the chambers 44 and 44' away from the common divider and so that the thrust of the chamber is confined to an axial direction; and in the course of expanding and contracting through each sequence it will be apparent that the total cubic inch displacement of the combined chambers does not vary. Again, recognizing that the clutch assembly is not triggered by torque or engine power and functions independently of other power train components, engagement can be effected before the application of torque to the drive train and with high forces available from high fluid pressure sources can readily overcome the biasing force of the spring 26 or 26' and any frictional resistance that may be present. Prefunction engagement in this manner enables the transfer case gears to become synchronized before attempting engagement and enables relatively smooth, synchronous low force engagement of the transfer case.

For the reason that the overall combined displacement of the chambers 44 and 44' does not vary in shifting the drive gear between engaged and disengaged positions, it therefore does not require venting to the atmosphere with the related problems of inhaling moisture or contaminants; nor does the invention require special filters or seals or impose undue pressure on existing seals of the system.

It should be noted that when the clutch mechanism of the present invention is applied to an axle disconnect, as shown in FIG. 7, it is not subject to substantial thrusting caused by steering or turning as occurs when the clutch mechanism is mounted or incorporated into the wheel hubs at opposite ends of a drive shaft, as shown in FIGS. 1 to 6. Thus, in the form of invention shown in FIGS. 1 to 6, when the front wheels of a vehicle are turned, the center line of the U-joint interconnecting the drive shafts A will tend to move in at least two different planes as well as reactivate third plane of movement caused by suspension flex or jounce. Thus, the shaft A must be permitted to move axially or linearly to a degree sufficient to not overstress; yet at the same time must be limited in such movement to avoid locking under applied torque or preventing or resisting steering in the opposite direction. Thus, the shafts A and clutch assembly are permitted to undergo a limited amount of reciprocal thrusting movement by virtue of the size and spacing of the ribs 60, 61 in cooperation with the ring 49. Moreover, the pressure chambers 44 and 44' in FIGS. 1 to 6 serve to shift the mechanism under high pressure to override any friction of the gears interfacing under torque. However, once shifted, there is no need for continued application of force but only to maintain the relative position of the gears while in the four-wheel drive mode and the pressure need not be maintained. In two-wheel drive, the detent 49 serves only to maintain the gears from accidentally sliding outwardly under certain impact, turning or steering forces. Typically, in an axial disconnect the shaft portions A1 and A2 are fixed axially with respect to one another by snap rings, not shown, and to some extent by the shim or thrust washer G1. As a result, the detenting is not required for the clutch mechanism in an axle disconnect as it is for the wheel hub application.

It is accordingly to be understood that while preferred and modified forms of the present invention are herein set forth and described that various other modifications and changes may be made without departing from the spirit and scope of the present invention as defined by the appended claims.

I claim:

1. A clutch assembly to effect positive engagement and disengagement between a first rotatable drive member and second member to be driven and wherein an axially displaceable clutch member is keyed for rotation to said first drive member and a second clutch member is drivingly connected to said second member to be driven, said first clutch member movable into and out of intermeshing engagement with said second clutch member, pressure-responsive shift means associated with said first clutch member including annular non-rotatable pressure chamber means expandable and contractable in axial directions toward and away from said second clutch member, and fluid pressure operator means for applying positive pressure to said shift means for positively advancing said first clutch member into and out of engagement with said second clutch member.

2. A clutch assembly according to claim 1, said pressure chamber means including a pair of annular pressure chambers in juxtaposed relation to one another, and said operator means including fluid flow control valve means simultaneously expanding one of said chambers while contracting the other of said chambers to advance said first clutch member into engagement with said second clutch member.

3. A clutch assembly according to claim 2, said operator means further operative to expand the other of said chambers as said one chamber is contracted to advance said first clutch member away from engagement with said second clutch member.

4. A clutch assembly according to claim 3, a fixed divider portion between said pressure chambers.

5. A clutch assembly according to claim 4, said shift means including a housing for said chambers, a follower at one end of said housing movable in response to expansion and contraction of said chambers to control advancement and retraction of said first clutch member toward and away from said second clutch member, and detent means for releasably retaining said first clutch member in the position to which it is driven by said shift means independently of the expansion and contraction of said chambers.

6. A clutch assembly according to claim 1, said operator means including flow control valve means for controlling the delivery and return of fluid under pressure to and from said pressure chamber means under the direct control of the vehicle operator.

7. A clutch assembly according to claim 6, said pressure chamber means having a pair of pressure chambers of annular configuration, and means confining expansion and contraction of said pressure chambers in an axial direction toward and away from said second clutch member.

8. A clutch assembly according to claim 6, said fluid flow control valve means movable between a first position in which fluid under pressure is delivered to one of said chambers while removing fluid under pressure from the other of said chambers, a second position in which fluid under pressure is delivered to the other of said chambers while removing the fluid under pressure from said one chamber, and a neutral position in which delivery of fluid under pressure is interrupted between said fluid control valve means and said pressure chambers, and detent means for releasably retaining said first clutch member in the position to which it is driven by said shift means independently of the expansion and contraction of said chambers.

9. A remote-activated clutch assembly to effect positive engagement and disengagement between a first rotatable drive member and second member to be driven and wherein an axially displaceable clutch member is keyed for rotation to said first drive member and a second clutch member is drivingly connected to said second member, to be driven, said first clutch member movable into and out of intermeshing engagement with said second clutch member, means biasing said first clutch member away from said second clutch member, pressure-responsive shift means associated with said first clutch member including pressure chamber means expandable and contractable in axial directions toward and away from said second clutch member, said pressure chamber means including a pair of annular pressure chambers in juxtaposed relation to one another, and fluid pressure operator means including control valve means simultaneously expanding one of said chambers while contracting the other of said chambers to advance said first clutch member into engagement with said second clutch member.

10. A clutch assembly according to claim 9, said operator means further operative to expand the other of said chambers as said one chamber is contracted to advance said first clutch member away from engagement with said second clutch member, and a fixed divider portion between said pressure chambers.

11. A clutch assembly according to claim 9, said shift means including a housing for said chambers including opposite ends movable in response to expansion and contraction of said chambers to control advancement and retraction of said first clutch member toward and away from said second clutch member.

12. In a clutch assembly for shifting a vehicle between two-wheel and four-wheel drive having a receiver gear and a drive gear keyed for rotation with a drive shaft, said drive gear and said receiver gear having gear teeth intermeshing with one another when said drive gear is moved into engagement with said receiver gear to shift said vehicle into four-wheel drive, the improvement comprising:
 fluid pressure-responsive shift means engageable with said drive gear, said shift means including pressure chamber means of annular configuration disposed in coaxial relation to said drive gear; and
 fluid pressure-operated activating means for applying positive pressure to said shift means to positively advance said drive gear into and out of engagement with said receiver gear in converting between two-wheel and four-wheel drive.

13. In a clutch assembly according to claim 12, said pressure chamber means including a pair of pressure chambers of annular configuration disposed in coaxial relation to one another and to said drive gear, and said activating means including fluid delivery lines for directing fluid into and out of said pressure chambers to regulate their expansion and contraction.

14. In a clutch assembly according to claim 13, each of said pressure chambers being expandable in response to fluid pressure delivered into said chamber and contractable in response to removal of fluid under pressure from said chamber.

15. In a clutch assembly according to claim 14, said shift means including a fixed divider wall between said pressure chambers and an outer housing wall in surrounding relation to said pressure chamber.

16. In a clutch assembly for shifting a vehicle between two-wheel and four-wheel drive wherein a receiver gear is associated with a ground-engaging wheel and an axially displaceable drive gear is keyed for rotation with a drive shaft, said drive gear and said receiver gear having gear teeth intermeshing with one another when said drive gear is moved into engagement with said receiver gear, the improvement comprising:
 fluid pressure-responsive shift means engageable with said drive gear, said shift means including pressure chamber means of annular configuration disposed in coaxial relation to said drive gear including a pair of pressure chambers of annular configuration disposed in coaxial relation to one another and to said drive gear;
 fluid pressure-operated activating means for applying positive pressure to said shift means to positively advance said drive gear into and out of engagement with said receiver gear in converting between two-wheel and four-wheel drive, and said activating means including fluid delivery lines for directing fluid into and out of said pressure chambers to regulate their expansion and contraction.

17. In a clutch assembly according to claim 16, said shift means including a fixed divider wall between said pressure chambers and an outer housing wall in surrounding relation to said pressure chamber, each of said pressure chambers being expandable in response to fluid pressure delivered into said chamber and contractable in response to removal of fluid under pressure from said chamber.

18. In a clutch assembly according to claim 17, said fluid pressure-operated activating means causing pressurized expansion of one of said pressurized chambers and simultaneous contraction of the other of said pressure chambers proportionate to the expansion of said one chamber whereby the total cubic displacement of said pair of pressure chambers remains constant in advancing said drive gear into and out of engagement with said receiver gear.

* * * * *